US008211278B2

(12) United States Patent
Weirauch, Jr. et al.

(10) Patent No.: US 8,211,278 B2
(45) Date of Patent: Jul. 3, 2012

(54) COMPOSITION FOR MAKING WETTABLE CATHODE IN ALUMINUM SMELTING

(75) Inventors: Douglas A. Weirauch, Jr., Murrysville, PA (US); Lance M. Sworts, New Kensington, PA (US); Brian J. Tielsch, Belle Vernon, PA (US); Robert A. DiMilia, Greensburg, PA (US)

(73) Assignee: Alcoa Inc., Pittsburgh, PA (US)

( * ) Notice: Subject to any disclaimer, the term of this patent is extended or adjusted under 35 U.S.C. 154(b) by 153 days.

(21) Appl. No.: 12/845,540

(22) Filed: Jul. 28, 2010

(65) Prior Publication Data

US 2011/0024304 A1 Feb. 3, 2011

Related U.S. Application Data

(60) Provisional application No. 61/229,083, filed on Jul. 28, 2009.

(51) Int. Cl.
| C25B 11/10 | (2006.01) |
| C25C 3/06 | (2006.01) |
| C25C 3/12 | (2006.01) |
| C25C 7/02 | (2006.01) |
| H01B 1/06 | (2006.01) |

(52) U.S. Cl. ............ 204/291; 204/243.1; 204/247.3; 501/94; 501/96.1; 501/96.3; 252/518.1; 252/519.12; 252/521.4

(58) Field of Classification Search ............ 204/243.1, 204/247.3, 291; 501/94, 96.1, 96.3; 252/518.1, 252/519.12, 521.4

See application file for complete search history.

(56) References Cited

U.S. PATENT DOCUMENTS

| 2,915,442 | A | | 12/1959 | Lewis | 204/67 |
| 3,028,324 | A | | 4/1962 | Ransley | 204/67 |
| 3,156,639 | A | | 11/1964 | Kibby | 204/243 |
| 3,314,876 | A | | 4/1967 | Ransley | 204/291 |
| 3,400,061 | A | | 9/1968 | Lewis et al. | 604/67 |
| 3,676,371 | A | | 7/1972 | Zollner et al. | 252/507 |
| 4,071,420 | A | | 1/1978 | Foster, Jr. et al. | 204/67 |
| 4,134,806 | A | | 1/1979 | de Nora et al. | 205/560 |
| 4,146,438 | A | | 3/1979 | de Nora et al. | 205/43 |
| 4,187,155 | A | | 2/1980 | de Nora et al. | 205/383 |
| 4,231,853 | A | | 11/1980 | Rahn | 204/243 R |
| 4,266,977 | A | | 5/1981 | Steiger | 501/87 |
| 4,282,195 | A | | 8/1981 | Hoekje | 423/289 |
| 4,308,114 | A | | 12/1981 | Das et al. | 204/67 |
| 4,353,885 | A | | 10/1982 | Hoekje | 423/289 |
| 4,377,463 | A | | 3/1983 | Joo et al. | 204/294 |
| 4,439,382 | A | | 3/1984 | Joo' et al. | 264/29.5 |
| 4,465,581 | A | | 8/1984 | Juel et al. | 427/126.1 |
| 4,540,475 | A | | 9/1985 | DeAngelis | 205/374 |
| 5,019,225 | A | | 5/1991 | Darracq et al. | 204/67 |
| 5,102,835 | A | * | 4/1992 | Saito et al. | 501/92 |
| 5,372,979 | A | * | 12/1994 | Sigl et al. | 501/96.3 |
| 5,374,392 | A | * | 12/1994 | Skelcey et al. | 419/49 |
| 5,632,941 | A | * | 5/1997 | Mehrotra et al. | 264/656 |
| 5,837,327 | A | * | 11/1998 | Sue et al. | 427/456 |
| 6,001,236 | A | | 12/1999 | de Nora et al. | 205/230 |
| 2006/0029512 | A1 | * | 2/2006 | Dong et al. | 419/38 |

FOREIGN PATENT DOCUMENTS

| CN | 1986897 | 6/2007 |
| CN | 1986898 | 6/2007 |
| CN | 10-1724861 | 6/2010 |
| WO | WO2004/007804 | 1/2004 |
| WO | WO2010/056976 | 5/2010 |

OTHER PUBLICATIONS

BAE Systems brochure, "Pressure Assisted Densification (PAD) Titanium Diboride," Copyright 2006, retrieved online at http://www.baesystems.com/ProductsServices/bae_prod_ss_PAD_TD.html, on Dec. 21, 2009.

International Search Report and Written Opinion from corresponding International Application No. PCT/US2010/043554, mailed Oct. 11, 2010.

Momentive Performance Materials brochure, "Titanium Diboride Powder, TiB2," Copyright 2006-2007, online at www.momentive.com.

Basu, B., et al., "Processing and Properties of Monolithic TiB2 Based Materials," *Int. Mat. Rev.*, 51(6):352-374, (2006).

Einarsrud, M., et al., "Pressureless Sintering ot Titanium Diboride with Nickel, Nickel Boride, and Iron Additives," *J. Am. Ceram. Soc.*, 80(12):3013-3020, (1997).

Ferber, M. K., et al., "Effect of Microstructures on the Properties of $TiB_2$ Ceramics," *Commun. Amer. Ceram. Soc.*, C-2 to C-3, (Jan. 1983).

Finch, C. B., et al., "Effect of Impurities on the Densification of Submicrometer $TiB_2$ Powders," *Adv.Ceram.Mat.* 1(1):50-54 (1986).

Graziani, T., et al., "Effects of Fe and Ni Additions on Sintering and Microstructure of $TiB_2$," pp. 535-539 in: Euro-Ceramics II, vol. 1, Basic Science and Processing of Ceramics, G. Ziegler and H. Hausner (eds.), Deutsche Keramische ges., Koln, Germany, *Proc. 2nd European Ceramic Soc. Conf.*, Held on Sep. 11-14, 1991 in Augsburg, FRG.

Graziani, T., et al., "Effects of Some Iron-group Metals on Densification and Characteristics of TiB2," *Refrac. Metals & Hard Materials*, 11:105-112, (1992).

Kang, E., et al., "Effect of Iron and Boron Carbide on the Densification and Mechanical Properties of Titanium Diboride Ceramics," *J. Amer. Ceram. Soc.* 72[10]:1868-1872, (1989).

Pastor, H. : in 'Boron and refractory borides', (ed. V.I. Matkovich), pp. 457-493; Springer-Verlag, New York, 1977.

(Continued)

*Primary Examiner* — Bruce Bell
(74) *Attorney, Agent, or Firm* — Greenberg Traurig, LLP

(57) ABSTRACT

Compositions for making wettable cathodes to be used in aluminum electrolysis cells are disclosed. The compositions generally include titanium diboride ($TiB_2$) and metal additives. The amount of selected metal additives may result in production of electrodes having a tailored density and/or porosity. The electrodes may be durable and used in aluminum electrolysis cells.

20 Claims, 1 Drawing Sheet

OTHER PUBLICATIONS

Shim, K. B., et al., "Microstructural Characterization of Titanium Diboride," *Materials Characterization* 31:39-46, (1993).

Shim, K. B., et al., "Use of Nickel and Iron Additions as Sintering Aids for Titanium Diboride," *Brit. Ceram. Trans.* 95(1):15-22, (1996).

Temery, V. J., et al., "Structure-Property Correlations for $TiB_2$-based Ceramics Densified Using Active Liquid Metals," pp. 891-909, in: Science of Hard Materials, R. K. Viswanadham, D. J. Rowcliffe, and J. Gurland (eds.), Plenum Press, NY, 1983.

Yen, C. F., et al., "Enhancement of mechanical strength in hot-pressed TiB composites by the additional Fe and Ni," in: New Developments and Applications in Composites, Transactions AIME, pp. 317-330, Warrendale, PA, 1979.

Zhang, J. Y., et al., "Wettability Between $TiB_2$ Ceramics and Metals," *Acta Metall. Sinica*, 12[4]:395-400, (Aug. 1999).

* cited by examiner

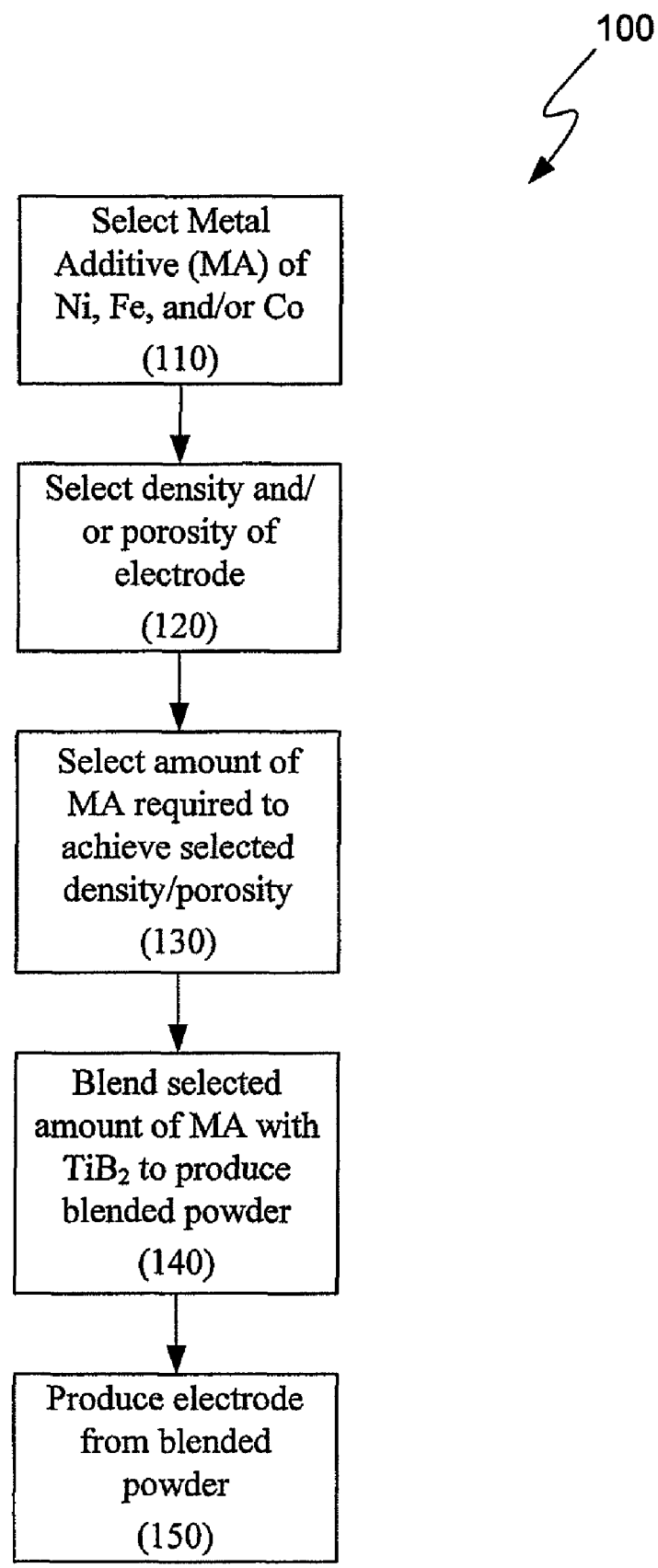

COMPOSITION FOR MAKING WETTABLE CATHODE IN ALUMINUM SMELTING

CROSS-REFERENCE TO RELATED APPLICATION

This patent application claims priority to U.S. Provisional Patent Application No. 61/229,083, entitled "COMPOSITION FOR MAKING WETTABLE CATHODE IN ALUMINUM SMELTING," filed Jul. 28, 2009, which is incorporated herein by reference in its entirety.

BACKGROUND

Aluminum electrolysis cells employ a system of anodes and cathodes. Typically, the cathode is produced from amorphous carbon, which is durable and inexpensive. However, a cathode or a cathode component that has better aluminum wettability and permits closer anode-cathode spacing by reducing movement of molten aluminum could improve the thermodynamic efficiency. Titanium diboride ($TiB_2$) is wettable by aluminum metal, and efforts have been made to produce cathodes from $TiB_2$. See, U.S. Pat. No. 4,439,382 to Joo, U.S. Pat. No. 2,915,442 to Lewis, U.S. Pat. No. 3,028,324 to Ransley, U.S. Pat. No. 3,156,639 to Kibby, U.S. Pat. No. 3,314,876 to Ransley, Apr. 18, 1967, U.S. Pat. No. 3,400,061 to Lewis, U.S. Pat. No. 4,071,420 to Foster, Canadian Pat. No. 922,384, Mar. 6, 1973, and Belgian Pat. No. 882,992. However, it is believed that no $TiB_2$ cathodes are currently in commercial use.

SUMMARY OF THE DISCLOSURE

Compositions for making wettable cathodes to be used in aluminum electrolysis cells are disclosed. One embodiment discloses a composition generally comprising titanium diboride ($TiB_2$). In some embodiments, a composition consists essentially of titanium diboride and at least one metal additive, the balance being unavoidable impurities. In some embodiments, the metal additive includes Co, Fe, Ni, and W, among others.

In one approach, an electrode is produced from the composition. The electrode includes (i) titanium diboride, (ii) from about 0.01 to about 0.75 wt. % metal additives; and (iii) the balance being unavoidable impurities. In one embodiment, the metal additives are selected from the group consisting of Fe, Ni, Co, and W, and combinations thereof. In one embodiment, the electrode includes not greater than about 0.65 wt. % of the metal additives. In other embodiments, the electrode includes not greater than about 0.60 wt. %, or not greater than about 0.55 wt. %, or not greater than about 0.50 wt. %, or not greater than about 0.45 wt. %, or not greater than about 0.40 wt. %, or not greater than about 0.35 wt. % of the metal additives. In one embodiment, the electrode includes at least about 0.025 wt. % of the metal additives. In other embodiments, the electrode includes at least about 0.050 wt. %, or at least about 0.075 wt. %, or at least about 0.10 wt. %, of the metal additives. The use of these amounts of metal additives in combination with the low amounts of unavoidable impurities at least partially facilitates the production and use of electrodes having suitable density, electrical and corrosion resistance properties.

For example, the electrodes may be fabricated from powders having compositions similar to that described above. In one embodiment, the electrodes may be fabricated using conventional powder sintering processes, such as hot pressing or pressureless sintering, among other powder sintering processes. Sintering is a method of making objects from powder, and includes heating at least one material in a sintering furnace below its melting point (solid state sintering) until the particles of the powder adhere to one other. Densification aids, such as the metal additives described above, may be incorporated to produce a dense-fired titanium diboride composition body. The densification aids may facilitate sintering by producing a liquid phase during heating, enabling the energy (e.g., temperature and/or pressure) to be lowered and the total amount of metal additives to be reduced/restricted.

With respect to the sintering temperature, the electrodes may be produced by sintering at temperatures of between about 1400° C. to about 2100° C. In some embodiments, the temperature may be in the range of from about 1600° C. to about 2000° C. In one embodiment, pressure assisted densification processes are used to produce the electrodes. In these embodiments, pressures of from about 70 to at least about 350 kg/cm$^2$ may be applied during sintering.

As described above, the use of the metal additives in the above-described quantities facilitates densification of the powders into electrodes. In one embodiment, the metal additives are selected such that the produced electrode has a density of from about 80% to about 99% of its theoretical density. The production of electrodes having a density within this range, facilitates long-term use in aluminum electrolysis cells (e.g., using carbon anodes and/or inert anodes). If the density is too high, the electrodes may crack during use in the cell. If the density is too low, the material may not have sufficient durability.

A theoretical density ($\rho_{theory}$) is the highest density that a material could achieve as calculated from the atomic weight and crystal structure.

$$\rho_{theory} = \frac{N_c A}{V_c N_A}$$

Where:
$N_c$=number of atoms in unit cell
A=Atomic Weight [kg mol$^{-1}$]
$V_c$=Volume of unit cell [m$^3$]
$N_A$=Avogadro's number [atoms mol$^{-1}$]
For the purposes of this patent application the theoretical density is 4.52 g/cc, which is the approximate theoretical density of pure $TiB_2$.

In one embodiment, the electrode has a density of at least about 85% of its theoretical density (i.e., $\geq$3.842 g/cc). In other embodiments, the electrode has a density of at least about 86% ($\geq$3.887 g/cc), or at least about 87% ($\geq$3.932 g/cc), or at least about 88% ($\geq$3.978 g/cc), or at least about 89% ($\geq$4.023 g/cc), or at least about 90% ($\geq$4.068 g/cc) of its theoretical density. In one embodiment, the electrode has a density of not greater than about 98.0% of its theoretical density ($\leq$4.430 g/cc). In other embodiments, the electrode has a density of not greater than about 97.5% ($\leq$4.407 g/cc), or not greater than about 97.0% ($\leq$4.384 g/cc), or not greater than about 96.5% ($\leq$4.362 g/cc), or not greater than about 96.0% ($\leq$4.339 g/cc), or not greater than about 95.5% ($\leq$4.317 g/cc), or not greater than about 95.0% ($\leq$4.294 g/cc) of its theoretical density. In some embodiments, the electrodes have a density in the range of from about 90% to 95% of its theoretical density (4.068 g/cc to 4.294 g/cc), such as from about 91% to 94% of its theoretical density (4.113 g/cc to 4.249 g/cc).

Electrodes having a density of 80-99% of theoretical may have a porosity suitable for use in an aluminum electrolysis cell. Total porosity is related to the percent of the theoretical density. For example, if a material has a density of about 90% of its theoretical density, it has about 10% total porosity (100%−90%=10%). That is, the 100% theoretical density of an object minus the actual density of the object equals its total porosity (TD−AD=TP). The total porosity is the combined amounts of the open (apparent) porosity and the closed porosity (TP=OP+CP). An apparent porosity of a material can be determined via Archimedes principle as embodied in ASTM C373-88 (2006) Standard Test Method for Water Absorption, Bulk Density, Apparent Porosity, and Apparent Specific Gravity of Fired Whiteware Products.

Generally, electrodes produced using the present compositions may realize an apparent porosity of about 0.01 to about 20%. In contradistinction to the conventional wisdom, it has been found electrodes having a high porosity and low density were durable in use in an aluminum electrolysis cell setting, as illustrated in the below examples. In one embodiment, the apparent porosity is in the range of 0.03-10%. In another embodiment, the apparent porosity is in the range of 0.04-5%. In another embodiment, the apparent porosity is in the range of 0.05-4%.

Methods for producing the electrodes may include selecting the appropriate amount of metal additive relative to the density required. In one embodiment, and with reference now to FIG. 1, a method (100) may include selecting a metal additive selected from the group consisting of Fe, Ni, and Co, and combinations thereof (110), selecting a density and/or porosity of an electrode to be produced (120), selecting an amount of the metal additive to achieve the selected density and/or porosity (130), blending the selected amount of metal additive with a $TiB_2$ powder to produce a blended powder composition (140), and producing an electrode from the blended composition (150), wherein the electrode realizes an actual density and/or porosity that is substantially similar to the selected density and/or porosity. In one embodiment, the density is selected. In one embodiment, the porosity is selected. In one embodiment, both the density and porosity are selected, with density being the primary consideration and the porosity being the secondary consideration. In one embodiment, both the density and porosity are selected, with porosity being the primary consideration and the density being the secondary consideration. In one embodiment, both the density and porosity are selected, with both the density and porosity being of equal importance. In turn, the electrode may be used as one of a cathode and an anode in an aluminum electrolysis cell. The use may include passing electricity through the electrode while the electrode is in communication with a molten salt bath of the aluminum electrolysis cell. In response, $Al_2O_3$ of the molten salt bath may be reduced to aluminum metal. In one embodiment, the electrode remains whole and absent of delamination and/or cracking for at least 120 days of continuous use in the aluminum electrolysis cell.

To achieve the selected density, a certain amount of metal additive combinations may be employed. For example, compositions for the electrode may include at least one of the metal additives of Fe, Ni, Co and W and in a range of from about 0.01 wt. % to about 0.35 wt. %, the balance being $TiB_2$ and unavoidable impurities, wherein the total amount of metal additives does not exceed 0.75 wt. %. In one embodiment, the composition includes 0.01 to 0.10 wt. % each of Fe, Ni, and Co, and 0.01 to 0.35 wt. % of W, the balance being $TiB_2$ and unavoidable impurities, wherein the total amount of metal additives does not exceed 0.55 wt. %. In another embodiment, the composition includes 0.01 to 0.075 wt. % each of Fe, Ni, and Co, and 0.01 to 0.20 wt. % of W, the balance being $TiB_2$ and unavoidable impurities, wherein the total amount of metal additives does not exceed 0.375 wt. %. In another embodiment, the composition includes 0.01 to 0.06 wt. % each of Fe, Ni, and Co, and 0.01 to 0.175 wt. % of W, the balance being $TiB_2$ and unavoidable impurities, wherein the total amount of metal additives does not exceed 0.35 wt. %.

In one approach, an electrode include 0.01 to 0.14 wt. % Fe, 0.01 to 0.14 wt. % Ni, 0.01 to 0.14 wt. % Co, and 0.01 to 0.45 wt. % W, the balance being $TiB_2$ and unavoidable impurities, wherein the total amount of metal additives does not exceed 0.75 wt. %. In one embodiment, the electrode includes not greater than 0.10 wt. % each of Fe, Ni, and Co. In another embodiment, the electrode includes not greater than 0.07 wt. % each of Fe, Ni, and Co. In another embodiment, the electrode includes not greater than 0.05 wt. % each of Fe, Ni, and Co. In one embodiment, the electrode includes not greater than 0.30 wt. % W. In one embodiment, the electrode includes not greater than 0.20 wt. % W.

As used herein, "unavoidable impurities" and the like mean constituents that may be included in a composition (e.g., an electrode) other than the metal additives and $TiB_2$ described above. Unavoidable impurities may be included in the composition due to the inherent manufacturing processes used to produce the composition. Examples of unavoidable impurities includes O and C, among others. With respect to oxygen, this element may be present as an impurity in amounts of up to about 2.0 wt. %. In one embodiment, not greater than about 1.5 wt. % O is included in the composition. In other embodiments, not greater than about 1.25 wt. % O, or not greater than about 1.0 wt. % O, or not greater than about 0.75 wt. % O, or not greater than about 0.5 wt. % O, or even less, is included in the composition. In some instance, the oxygen level in an electrode may be approximately 0.5 wt. % so as to avoid abnormal grain growth during production of the electrode.

With respect to carbon, this element may be present as an unavoidable impurity in amounts of up to about 1.0 wt. %. In one embodiment, not greater than about 0.9 wt. % C is included in the composition. In other embodiments, not greater than about 0.8 wt. % C, or not greater than about 0.7 wt. % C, or not greater than about 0.6 wt. % C, or not greater than about 0.5 wt. % C, or even less, is included in the composition.

A mix and match of the metal additives may be incorporated in a composition. For example, a composition may include only one, two or three additives instead of the four described above. In these situations, the additives may be included in the composition in amounts similar to those described above, and the composition may potentially be adjusted to include slightly more of these additives to account for the removal of the other additive(s). In some embodiments, substitutes for Fe, Ni, Co and/or W may be employed, such as Cr, Mn, Mo, Pt, Pd, to name a few. These metal additive substitutes may be employed in addition to, or as a substitute for, the principle metal additives of Fe, Ni, Co, or W.

The electrodes may be used as an anode or cathode in an aluminum electrolysis cell. In one embodiment, the electrode is a cathode. In some embodiments, the plates may be used as cathodes in a vertical configuration, a horizontal configuration, or inclined configuration (e.g., drained), among others. In one embodiment, the electrode is wettable, meaning that the produced material during electrolysis (e.g., aluminum) may tend to stick to the surface of the electrode during electrolysis operations.

In some embodiments, the compositions may be used to produce other components of an aluminum electrolysis cell, such as cell superstructures, protection tubes, and other applications in aluminum smelting or molten aluminum processing in general. In one embodiment, thermocouple protection tubes may incorporate the compositions disclosed herein. In another embodiment, the compositions may be used for the construction of a cell sidewall. In some instances, the compositions are able to provide electrical polarization and/or corrosion resistant properties, among others. In some examples, the compositions may be used as a coating or as dopants in the manufacturing of a part, among other forming techniques. For example, the compositions may be included as additives in a powder production process. In another example, the compositions may be added during the processing of fired parts. In other examples, the compositions may be incorporated as dopants during the physical fabrication of a part (e.g., cell sidewall, protection tubes).

Products utilizing the disclosed composition may be fabricated into various geometries including tubes, plates, rods, to name a few. The size and shape of the final product may vary, depending on the required electrical and mechanical properties of the cathode within the aluminum electrolysis cell. Examples of electrode plate sizes include square plates of having a length/width of about 12 inches and a thickness of about 0.25 inch or 0.5 inch, and rectangular billets having about a 4 inch width, about an 8 inch length, and thickness of about 0.25 or 0.5 inch. In some embodiments, a rectangular plate is about 12 inches in width, about 16 inches in length, and about 0.25 or 0.5 inch thick. In one embodiment, a rectangular plate is about 15 inches in width, about 22 inches in length, and is about 1 or 2 inch thick.

BRIEF DESCRIPTION OF THE DRAWINGS

FIG. 1 is flow chart illustrating one embodiment of a method for producing electrodes having a selected density.

DETAILED DESCRIPTION

Example 1

Three different $TiB_2$ powders having the chemical make-up identified in Table 1, below, are produced by blending $TiB_2$ powders (e.g., via a V-blender) with various other powders (all values are approximate. Composition D is pure $TiB_2$ powder containing no metal additives. Various plates are made from Compositions A-D by pressing the compositions into plate form using a commercial-scale hot-press.

TABLE 1

Chemical Makeup of Plates A-D

| Material (wt. %) | Composition A | Composition B | Composition C | Composition D |
|---|---|---|---|---|
| Fe | 0.14 | 0.08 | 0.05 | Negligible |
| Ni | 0.16 | 0.08 | 0.04 | Negligible |
| Co | 0.16 | 0.08 | 0.04 | Negligible |
| W | 0.49 | 0.31 | 0.16 | Negligible |
| $TiB_2$ and Unavoidable Impurities | Balance | Balance | Balance | Balance |
| Ave. density (% of theoretical) | 98.9% | 98.2% | 94.9% | 68.8% |
| Bulk density (g/cc) | 4.47 | 4.44 | 4.29 | 3.11 |
| Apparent Porosity, % | 0.07 | 0.09 | 0.13 | 28.6 |
| Total Metal Additives (wt. %) | 0.95% | 0.55% | 0.29% | 0% |

Plates made from compositions A-C are exposed to a molten salt bath of a 10,000 ampere pilot-scale aluminum electrolysis cell. The plates made from Composition A fail the testing, showing splitting/delamination. There is a mixed failure rate among plates made from Composition B. The plates made from composition C all pass the test, in that they survive about 120 days of testing without significant loss in thickness and without splitting/delamination.

Plates made from Composition D, i.e., pure titanium diboride, are machined into test coupons (e.g., 2"×2"×0.5"), and the test coupons are exposed a molten aluminum bath having a salt cover in an alumina crucible. The temperature of the molten aluminum was comparable to the conditions used in the aluminum electrolysis cell using inert anodes (e.g., in the range of 840-910° C.). The test coupons were exposed to the molten aluminum for about 480 hours. After the exposure period, the test coupons are removed hot from the crucible and air quenched. The test coupons are examined both by macroscopic inspection and by microstructure analysis (e.g., via SEM metallography). A test coupon "passes" if it is (a) intact as shown via macroscopic inspection, and (b) there is no visually apparent cracking due to aluminum filled cracks, as shown via the microstructure analysis. If either criteria is not met, the test coupon is considered a "fail". The test coupons made from Composition D failed, show grain boundary attack and disintegration after anywhere from 7 to 20 days of testing, illustrating the inadequacy of pure $TiB_2$ electrode plates.

With respect to Plates A and B, it is theorized, but not being bound by this theory, that higher concentration of additives such as the likes of Ni, Co, Fe and/or W, may have led to stress corrosion cracking. The higher additive levels may have also led to potential volumetric expansion reactions between the commonly-used metals and aluminum during metal making. However, when the metal additive levels are low enough, stress corrosion cracking is not realized (e.g., due to insufficient materials to react with the aluminum metal of the bath).

Plates having too high of a theoretical density, i.e., plates made from Composition A, and some made from Composition B, fail the test. This indicates that the theoretical density should be below about 98%. Indeed, plates made from composition C, which have a density of about 95% of theoretical, were successful in passing the pilot testing. Thus, it is anticipated that plates having a density in the range of 90-98% of theoretical may be effectively used as electrodes in an aluminum electrolysis cell. The noted metal additives may be useful in producing such plates and with the appropriate porosity.

This data also suggests that the total amount of metal additives should be less than 0.55 wt. %. However, it is anticipated that higher amounts of metal additives (e.g., up to about 0.75 wt. % total) could be employed in some circumstances. The data also shows that at least some metal additives are required; plates made from pure $TiB_2$ (Composition D) were the worst performing, indicating that at least some metal additive is required.

Example 2

Similar to Example 1, various powder blends are produced by blending. The weight percent of the metal additives of the various blended samples are provided in Table 2, below, the balance being TiB₂ and unavoidable impurities. TiB₂ powder samples are pressed into plate form using a lab-scale, hot-press. After pressing, the plates are machined into test coupons (e.g., 2"×2"×0.5").

TABLE 2

Chemical Makeup of Samples 1-9

| Sample | Material (weight %) | Total Metal Add. (wt. %) | Ave. Density (% of theoret.) | Apparent Porosity (%) | Result |
|---|---|---|---|---|---|
| 1 | 0.125 Ni | 0.125 | 97.2 | 0.09 | Pass |
| 2 | 0.25 Ni | 0.25 | 98.5 | 0.23 | Pass |
| 3 | 0.063 Fe | 0.063 | 88.9 | 3.79 | Pass |
| 4 | 0.125 Fe | 0.125 | 97.0 | 0.10 | Pass |
| 5 | 0.25 Fe | 0.25 | 98.0 | 0.05 | Pass |
| 6 | 0.50 Fe | 0.50 | 98.8 | 0.12 | Fail |
| 7 | 0.6 W | 0.60 | 61.9 | 37.2 | Fail |
| 8 | 0.5 Fe + 0.6 W | 1.1 | 99.6 | 0.07 | Fail |
| 9 | 0.05 each of Fe, Ni, Co + 0.15W | 0.30 | 97.8 | 0.18 | Pass |

The test coupons are exposed to a molten aluminum bath having a salt cover in an alumina crucible. The temperature of the molten aluminum was comparable to the conditions used in aluminum electrolysis cells employing inert anodes (e.g., in the range of 840-910° C.). The test coupons were exposed to the molten aluminum for about 480 hours. After the exposure period, the test coupons are removed hot from the crucible and air quenched. The test coupons are examined both by macroscopic inspection and by microstructure analysis (e.g., via SEM metallography). A test coupon "passes" if it is (a) intact as shown via macroscopic inspection, and (b) there is no visually apparent cracking due to aluminum filled cracks, as shown via the microstructure analysis. If either criteria is not met, the test coupon is considered a "fail".

Plates having too high of a theoretical density, i.e., plates made from samples 6 and 8 failed the test. However, plates having a density below about 98.5%, but above about 88.9% (of theoretical) were able to pass the test. Similarly, plates having too low of a of density, i.e., plates made from sample 7, failed the test. This data suggests that any of the metal additives of Fe, Ni, and/or Co may be selected as the metal additive so long as the end products have a density of from about 85% to about 98.5% of the theoretical density. In some instances, W and/or other substitutes, described above, may be used in place of and/or in addition to the Fe, Ni, and Co metal additives. This data suggests that the total amount of metal additives should be less than 0.50 wt. %. However, it is anticipated that higher amounts of metal additives (e.g., up to about 0.75 wt. % total) could be employed in some circumstances.

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. An electrode for use in an aluminum electrolysis cell, the electrode comprising:
    0.01 to 0.75 wt. % metal additives, wherein the metal additives are selected from the group consisting of Fe, Ni, Co, and W, and combinations thereof;
    the balance being TiB₂ and unavoidable impurities, wherein the unavoidable impurities make up less than 2 wt. % of the electrode;
    wherein the electrode has a density of at least about 85% of its theoretical density.

2. The electrode of claim 1, wherein the electrode includes not greater than 0.65 wt. % metal additives.

3. The electrode of claim 1, wherein the electrode includes not greater than 0.50 wt. % metal additives.

4. The electrode of claim 3, wherein the electrode includes at least about 0.05 wt. % metal additives.

5. The electrode of claim 4, wherein the metal additive is selected from the group consisting of Fe, Ni and Co.

6. The electrode of claim 5, wherein the metal additive is Fe.

7. The electrode of claim 5, wherein the metal additive is Ni.

8. The electrode of claim 5, wherein the metal additive is Co.

9. The electrode of claim 1, comprising:
    0.01 to 0.14 wt. % Fe;
    0.01 to 0.14 wt. % Ni;
    0.01 to 0.14 wt. % Co; and
    0.01 to 0.45 wt. % W.

10. The electrode of claim 9, comprising not greater than 0.10 wt. % each of Fe, Ni, and Co.

11. The electrode of claim 9, comprising not greater than 0.07 wt. % each of Fe, Ni, and Co.

12. The electrode of claim 9, comprising not greater than 0.05 wt. % each of Fe, Ni, and Co.

13. The electrode of claim 10, comprising not greater than 0.30 wt. % W.

14. The electrode of claims 12, comprising not greater than 0.20 wt. % W.

15. An aluminum electrolysis cell comprising the electrode of claim 1.

16. A method comprising:
    (a) producing a blended TiB₂ composition, the producing step comprising:
        (i) selecting a metal additive selected from the group consisting of Fe, Ni, and Co, and combinations thereof;
        (ii) selecting a density of an electrode to be produced;
        (iii) selecting an amount of the metal additive to achieve the selected density; and
        (iv) blending the selected amount of metal additive with a TiB₂ powder to produce a blended powder composition;
    (b) producing an electrode from the blended TiB₂ composition, wherein the electrode realizes an actual density that is substantially similar to the selected density.

17. The method of claim 16, wherein the selected density is in the range of from about 4.068 g/cc to about 4.430 g/cc, and wherein the amount of selected metal additive is in the range of 0.01 to 0.75 wt. %.

18. The method of claim 16, comprising:
    using the electrode as one of a cathode and an anode in an aluminum electrolysis cell, wherein the using comprises:

passing electricity through the electrode while the electrode is in communication with a molten salt bath of the aluminum electrolysis cell; and in response to the passing step, reducing $Al_2O_3$ of the molten salt bath to aluminum metal.

19. The method of claim 18, wherein, during the using step, the electrode remains whole and absent of delamination and cracking for at least 120 days of continuous use.

20. A composition consisting essentially of $TiB_2$ and metal additives, wherein the composition includes 0.01 to 0.75 wt. % metal additives, the balance being the $TiB_2$ and unavoidable impurities, wherein the unavoidable impurities make up less than 2 wt. % of the electrode;

wherein the metal additives are selected from the group consisting of Fe, Ni, Co, and W, and combinations thereof; and wherein the electrode has a density of from about 85% to about 99% of its theoretical density.

* * * * *

UNITED STATES PATENT AND TRADEMARK OFFICE
CERTIFICATE OF CORRECTION

PATENT NO. : 8,211,278 B2
APPLICATION NO. : 12/845540
DATED : July 3, 2012
INVENTOR(S) : Weirauch, Jr. et al.

Page 1 of 1

It is certified that error appears in the above-identified patent and that said Letters Patent is hereby corrected as shown below:

Claim 20, column 10, line 3, after "2 wt. % of the", please delete "electrode;", and insert --composition;--.

Claim 20, column 10, line 7, after "wherein the", please delete "electrode", and insert --composition--.

Signed and Sealed this
Ninth Day of April, 2013

Teresa Stanek Rea
*Acting Director of the United States Patent and Trademark Office*